Dec. 10, 1946.   D. M. PHILLIPS   2,412,287
HUB FOR HOSE REELS AND THE LIKE
Filed June 30, 1943

Inventor
Dwight M Phillips
by *(signature)*
his Attorney

Patented Dec. 10, 1946

2,412,287

UNITED STATES PATENT OFFICE 2,412,287

HUB FOR HOSE REELS AND THE LIKE

Dwight M. Phillips, Fullerton, Calif., assignor to Chiksan Tool Company, Brea, Calif., a corporation of California Application June 30, 1943, Serial No. 492,831

13 Claims. (Cl. 285—97.3)

This invention relates to spools or reels and relates more particularly to hose reels. A general object of the invention is to provide a simple, practical and very effective hub structure for a hose reel.

Another object of this invention is to provide a hub assembly or unit for a hose reel handling a multiplicity of hoses.

Another object of this invention is to provide a hose reel hub embodying relatively rotatable elements and means for conducting fluids of different characters or grades to a plurality of hoses adapted to be wound on the reel.

Another object of this invention is to provide a hose reel hub of the character referred to in which the several fluids are kept entirely separate and distinct so that they cannot become commingled.

A further object of this invention is to provide a hub for hose reels and the like that embodies anti-friction means for connecting the fluid conducting hub parts for free relative rotation and further embodies sealing means for preventing the leakage of fluid from between the sections and from one fluid duct to another.

Figure 2:
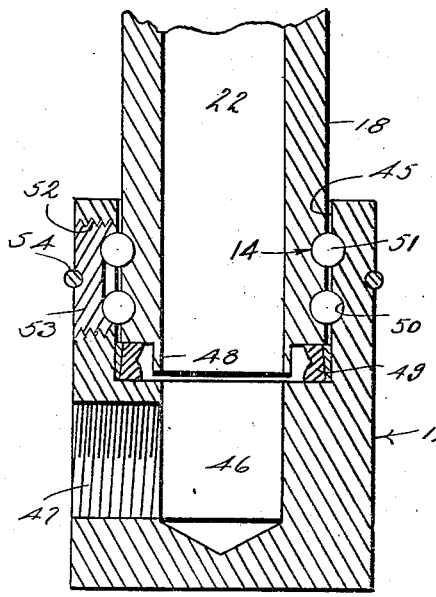
Figure 1:
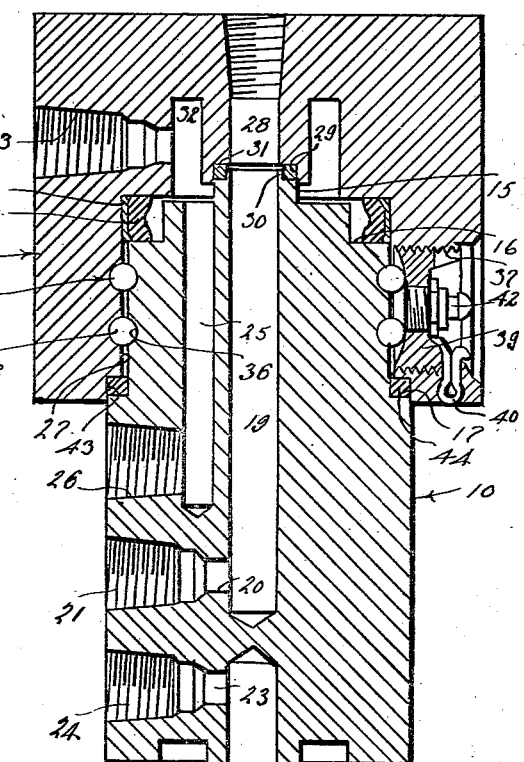
Figure 3:
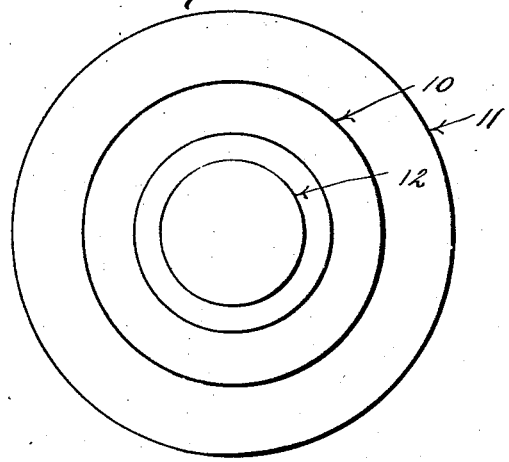

The various objects and features of my invention will be fully understood from the following detailed description of a typical preferred form and application of the invention, throughout which description reference is made to the accompanying drawing, in which:

Fig. 1 is a horizontal detailed sectional view of the reel hub assembly of the invention. Fig. 2 is an enlarged horizontal detailed sectional view of one end portion of the assembly, and Fig. 3 is an end elevation of the assembly.

The hose reel hub assembly of the invention may be said to comprise, generally, a body or intermediate section 10, end sections 11 and 12, and means 13 and 14 for rotatably connecting the sections 11 and 12, respectively, with the section.

The intermediate section 10 may be considered the rotating element of the hub assembly. The section 10 is an elongate cylindrical block-like part and is graduated or stepped at one end to have a small pilot 15 and an axially facing shoulder 16 of substantial area. A second shoulder 17 of less extent is spaced a considerable distance inwardly from the shoulder 16. The other end of the section 10 has a pilot or stem 18 of substantial length and of relatively small diameter. The pilot 15 and the stem 18 are co-axial with the body of the section 10. The major portion of the section 10 between the stem 18 and the shoulder 17 may be of uniform external diameter. It will be observed that the main section 10 of the assembly is a simple, one-piece part.

In accordance with the invention the section 10 is ported or provided with passages for carrying the fluid to the hoses. A central longitudinal passage 19 enters the section 10 from the outer end of its pilot 15 and extends a substantial distance through the body of the section. The passage 19 has a lateral branch 20 extending to the exterior of the section 10. The branch 20 communicates with the inner end portion of the passage 19 and is prepared for the reception of a hose, fitting, or the like. In the case illustrated the lateral branch 20 has a thread 21 and is enlarged at its mouth portion. A second central port or passage 22 enters the outer end of the stem 18 and extends longitudinally therethrough. The passage 22 continues some distance into the body of the section 10 and a lateral branch passage or opening 23 joins the inner portion of the opening 22 and extends to the exterior of the section 10. The mouth of the branch 23 may be enlarged in diameter and provided with a thread 24 to facilitate the connection of the hose, fitting, or the like, with the section 10. The branch 24 is spaced a short distance from the branch 21 and may lie in the same longitudinal plane. A third duct or passage 25 enters the end of the section 10 at or adjacent the base of the pilot 15 and extends longitudinally through the section in spaced adjacent relation to the passage 19. A lateral branch 26 communicates with the inner end of the passage 25 and extends radially to the periphery of the section 10. The wall of the branch 26 may carry a thread to facilitate the connection of the related hose or fitting with the section 10. In the particular construction illustrated the mouths of the three lateral branch passages 20, 23 and 26 are in alignment and occupy a common longitudinal plane and are of the same diameter.

The section 11 may be considered a relatively stationary part of the hub assembly. The section 11 is in the nature of a cylindrical block and is in co-axial relation with the section 10. The end section 11 is in the form of a cap or cup having a central socket 27 in its inner end which receives the end portion of the section 10 with clearance. The parts are proportioned and related so that the inner end surface of the section 11 is adjacent and slightly inward of the shoulder 17. The section 11 is considerably larger in diameter than the main section 10 and continues a substantial distance beyond the end of the section 10. The section 11 is ported to deliver separate fluids to the passages 19 and 25. A central longitudinal opening 28 extends through the section 11 from its outer end to register with the end of the passage 19. The outer end portion of the opening 28 is threaded or otherwise prepared to facilitate the connection of a hose, pipe, or fitting with the section 11 to deliver the fluid under pressure to the opening 28 and passage 19.

Means is provided for sealing between the sections 10 and 11 to prevent the leakage of fluid from the opening 28 and the passage 19. A socket or annular groove 29 is provided in the section 11 at the inner end of the opening 28 to oppose the end of the pilot 15. A narrow annular lip or rim 30 is provided on the end of the pilot 15 and enters the socket 29 with substantial clearance. A sealing ring 31 is provided in the socket 29 and is in spaced surrounding relation to the rim 30. The ends of the sealing ring 31 bear and seal against the bottom wall of the socket 29 and the end of the pilot 15. The ring 31 is formed of synthetic rubber, rubber composition, or the like. The interior of the sealing ring 31 is grooved or relieved so that the fluid pressure may expand the ring axially to better seal with the end of the pilot 15 and the wall of the socket 29. In this connection it will be observed that the extremity of the rim 30 is spaced from the bottom wall of the socket 29 to allow the fluid pressure from the opening 28 to act on the interior of the sealing ring 31.

The end section 11 is further provided with a port or passage system for conducting fluid to the passage 25 of the section 10. This system includes an annular groove 32 extending into the section 11 from the bottom of the socket 27. The groove 32 is in spaced surrounding relation to the socket 29 and extends inwardly to the pilot 15 at the mouth of the socket. The inner end or mouth of the groove 32 is in communication with the outer end of the passage 25. The groove 32 being annular remains in communication with the passage 25 even during relative rotation between the sections 10 and 11. A lateral opening 33 extends radially into the section 11 from its periphery and joins the inner portion of the annular groove 32. The opening 33 may be threaded to receive a pipe, hose or fitting for delivering fluid pressure to the port system.

Means is provided for preventing the leakage of the fluid handled by the groove 32 and the passage 25. The periphery of the above described sealing ring 31 is grooved so that fluid pressure from the groove 32 that may reach the sealing ring expands it axially to more effectively seal with the end of the pilot 15 and the end wall of the socket 29. It will be seen how the sealing ring 31 prevents commingling of the fluids handled by the separate port systems 28—19—20 and 32—25—26. The above described shoulder 16 formed on the end portion of the section 10 leaves or provides an annular space in the inner corner of the socket 27. A sealing ring assembly is provided in this space to prevent the leakage of fluid from the groove 32 and opening 25. The sealing ring assembly includes an outer ring or backing ring 34 of brass, or the like, bearing against the side wall of the socket 27. A sealing ring 35 of synthetic rubber, rubber composition, or the like, is arranged within the backing ring 34. The sealing ring 35 bears and seals against the bottom wall of the socket 27 and the shoulder 16. The interior of the sealing ring 35 is relieved or grooved so that the ring is expanded axially by the fluid pressures to better seal with the bottom wall of the socket 27 and the shoulder 16. It will be seen how the sealing ring 35 is actuated by the fluid pressure handled by the groove 32 and the passage 25 and how it prevents the escape of fluid from between the sections 10 and 11.

The means 13 for connecting the sections 10 and 11 is in the nature of an anti-friction means connecting the sections for free relative rotation. This means includes one or more pairs of registering annular grooves formed in the exterior of the section 10 and the wall of the socket 27. In the construction illustrated there are two pairs of these grooves. The registering grooves have concave walls and are shaped to form ball races 36. The two ball races 36 are spaced apart axially of the assembly and are spaced between the mouth and the bottom of the socket 27. A radial opening 37 is provided in the wall of the section 11 and interrupts the two outer grooves of the ball races 36 to provide for the insertion of series of balls 38 into the races 36. The balls 38 cooperating with the spaced raceways 36 dependably and positively connect the sections 10 and 11 for free relative rotation. The balls 38 transmit radial thrusts and axial thrusts in both directions. The parts are proportioned so that the balls 38 riding in the races 36 maintain the surfaces of the section 10 spaced from the walls of the socket 27.

A removable plug 39 closes the opening 37 to prevent the loss of the balls 38. The plug 39 is removably threaded in the opening 37 so that it may be removed when it is desired to remove the balls 38. A cotter key 40 is arranged through an axial opening in the inner end of the section 11 and cooperates with a notch or opening in the plug 39 to retain the plug in the correct position. The inner end of the plug 39 is recessed and is sufficiently large in diameter so that the balls 38 may ride over it. A grease fitting 42 may be threaded into an opening in the plug 39 to permit the lubrication of the anti-friction means 13. Means is provided for preventing the loss of the lubricant from the means 13. An annular groove 43 is provided in the wall of the socket 27 to be in front of the shoulder 17. A sealing ring 44 of felt, or the like, is provided in the groove 43 and seals with the shoulder 17 to prevent the escape of the lubricant from the means 13.

The section 12 of the assembly is rotatably secured to the outer portion of the pilot 18. The section 12 is a relatively small cylindrical part having a socket 45 in its inner end which receives the end portion of the stem with clearance (see Fig. 2). An opening 46 continues outwardly from the socket 45 and its inner end registers with the passage 22. The opening 46 has a lateral extension or branch 47 which extends to the periphery of the section 12. The branch 47 is threaded or otherwise prepared to receive a hose, pipe or fitting for delivering the fluid under pressure to the opening 46 and passage 22.

Means is provided for sealing between the section 12 and the stem 18 to prevent the leakage of the fluid pressure from the section. The end of the stem 18 is spaced from the bottom of the socket 45 and a narrow rim 48 extends from the end of the stem in surrounding relation to the passage 22. A sealing ring 49 of synthetic rubber, or the like, is arranged in the socket 45 in spaced surrounding relation to the rim 48. The sealing ring 49 bears and seals against the end of the stem 18 and side and bottom wall of the socket 45. The interior of the sealing ring 49 is relieved or grooved so that the ring is expanded axially by the fluid pressure to more effectively seal with the end of the stem 18 and the bottom wall of the socket 45.

The means 14 for connecting the sections 10 and 12 for free relative rotation is similar to the above described means 13. Axially spaced pairs of registering annular grooves are provided in the stem and wall of the socket 45 and are shaped to form ball races 50. Series of balls 51 are provided in the races 50 to connect the sections 10 and 12 for free relative turning. It will be seen that the series of balls 51 engaged in the spaced races 50 dependably and positively connect the sections 10 and 12 for free relative rotation and maintain the sections in the co-axial relation. A radial opening 52 is provided in the wall of the section 12 to permit the ready insertion of the balls 51 into the races 50. The opening 52 is normally closed by a removable threaded plug 53. The inner end of the plug 53 is socketed or recessed so that the balls 51 may roll over it. The invention includes means for locking the plug 53 in the correct rotative position and for preventing unthreading of the plug. This means includes a lock wire 54 engaged in an annular groove in the periphery of the section 12 and cooperating with a transverse groove or notch 55 in the outer end of the plug 53.

It is believed that the utility of the hose reel hub assembly will be readily understood from the foregoing detailed description. The assembly provides for the separate delivery of the different kinds or grades of fluid to the individual hoses and the sealing means of the assembly positively prevents commingling of the different fluids. The means 13 and 14 connects the three sections for free relative rotation and maintains the sections in true co-axial relation. The assembly provides for the delivery of separate fluids to a multiplicity of independent hoses and yet embodies a minimum number of simple parts.

Having described only a typical preferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. A hub assembly including an elongate intermediate section, two end sections, and means for connecting the intermediate section with the end sections for free rotation, the intermediate section having separate passages therein each including a lateral portion leading from its periphery and a longitudinal portion extending from the lateral portion to one of the end sections, the end sections having openings communicating with the longitudinal portions of the passages.

2. A reel hub assembly including an elongate body section having separate fluid passages leading from its periphery intermediate its ends to its opposite ends, end sections having openings individually communicating with the passages of the body section at the ends of the body, and means for rotatably connecting the sections so that the body section may rotate relative to the end sections.

3. In a reel hub assembly, a rotatable elongated body section having a plurality of separate passages leading from its periphery intermediate its ends to one end of the body, an end section at said end of the body section, and means for connecting the sections for relative rotation, the end section having separate openings each communicating with one of said passages at the end of the body.

4. In a reel hub assembly, a rotatable elongated body section having a plurality of separate passages leading from its periphery intermediate its ends to one end where one opens at the center of the body and another is open at the end of the body and is removed from the center of the body, an end section at said end of the body section, means for connecting the sections for relative rotation, the end section having a central fluid opening extending into it from its outer end and which communicates with the first mentioned passage of the body section and having an annular chamber communicating with the other passage of the body, the end section having a laterally disposed fluid opening extending into it from one side and communicating with the chamber, and means sealing between the sections to prevent the leakage of fluid from one set of communicating passage and opening to the other.

5. A reel hub including a rotatable body section having a reduced stem extending from one end, the body section having separate passages leading from its periphery to its other end and having a separate passage extending from its periphery to the end of its stem, a first end section having separate openings communicating with the first named passages of the body section to deliver fluid thereto, means for rotatably connecting the first end section and the body section for relative rotation, a second end section, and means for rotatably connecting the stem and the second end section for relative rotation, said second end section having an opening communicating with said separate passage to deliver fluid thereto.

6. A reel hub including a rotatable body section having a reduced stem extending from one end, the body section having separate passages leading from its periphery to its other end and having a separate passage extending from its periphery to the end of its stem, a first end section, means for connecting the body section and first end section for relative rotation, the first end section having openings which remain in communication with said separate passages to deliver fluid thereto, a second end section, and means for connecting the stem and said second end section for free relative rotation, said second end section having an opening remaining in communication with said separate passage to conduct fluid thereto.

7. A reel hub including a rotatable body section having a reduced stem extending from one end, the body section having separate passages leading from its periphery to its other end and having a separate passage extending from its periphery to the end of its stem, a first end section, means for connecting the body section and first end section for relative rotation, the first end section having openings which remain in communication with said separate passages to deliver fluid thereto, a second end section, and means for connecting the stem and said second end section for free relative rotation, said second end section having an opening remaining in communication with said separate passage to conduct fluid thereto, each of said means comprising walls on the sections defining ball races, and series of balls in said races.

8. In combination, an elongate body having separate fluid passages entering it intermediate its ends and extending to its opposite end portions, and end sections rotatably supported by the opposite end portions of the body to be spaced apart and from where the passages enter the body and having openings in communication with the passages of the body.

9. In combination, an elongate body having separate fluid passages entering it intermediate its ends and extending to its opposite end portions, and end sections rotatably supported by the opposite end portions of the body to be spaced apart and from where the passages enter the body and having openings in communication with the passages of the body, one of the end sections being mounted on its supporting end portion of the body to surround it.

10. In combination, an elongate body having separate fluid passages entering it intermediate its ends and extending to its opposite end portions, end sections at opposite end portions of the body spaced apart and from where the passages enter the body and having sockets receiving the end portions of the body, bearing means carried in the sockets of the end sections and engaging the exterior of the body rotatably connecting the end sections and body, the end sections having fluid handling ports communicating with the inner portions of the sockets at points removed from the bearing means, and packing means in the sockets between the end sections and body located between the ports and bearing means to prevent fluid being handled by the passages from reaching the bearing means.

11. In a reel hub assembly, a rotatable elongate body section having a plurality of separate passages leading from its periphery intermediate its ends to one end where one is at the center of the body and another is removed from the center of the body, an end section at said end of the body section, means for connecting the sections for relative rotation, the end section having separate fluid openings each of which communicates with but one of the passages of the body section, and means sealing between the sections to prevent the leakage of fluid from one set of communicating passage and opening to the other, one of the openings of the end section extending to the outer end of that section and the other extending to one side of that section.

12. In a reel hub assembly, a rotatable elongate body section having a plurality of separate passages leading from its periphery intermediate its ends to one end where one is at the center of the body and another is removed from the center of the body, an end section at said end of the body section, means for connecting the sections for relative rotation, the end section having separate fluid openings each of which communicates with but one of the passages of the body section, and means sealing between the sections to prevent the leakage of fluid from one set of communicating passage and opening to the other, one of the openings in the end section including an annular chamber registering with the passage of the body which is removed from the center of the body.

13. In a reel hub assembly, a rotatable elongate body section having a plurality of separate passages leading from its periphery intermediate its ends to one end where one is at the center of the body and another is removed from the center of the body, an end section surrounding said end of the body section, means for connecting the sections for relative rotation, the end section having separate fluid openings each of which communicates with but one of the passages of the body section, and means sealing between the sections to prevent the leakage of fluid from one set of communicating passage and opening to the other, one of the openings in the end section being centrally located to register with the passage at the center of the body and the other having an annular chamber registering with the passage which is removed from the center of the body.

DWIGHT M. PHILLIPS.